June 28, 1949.  W. C. WEIS  2,474,503
SEAL FOR FILLER TUBES
Filed April 25, 1947
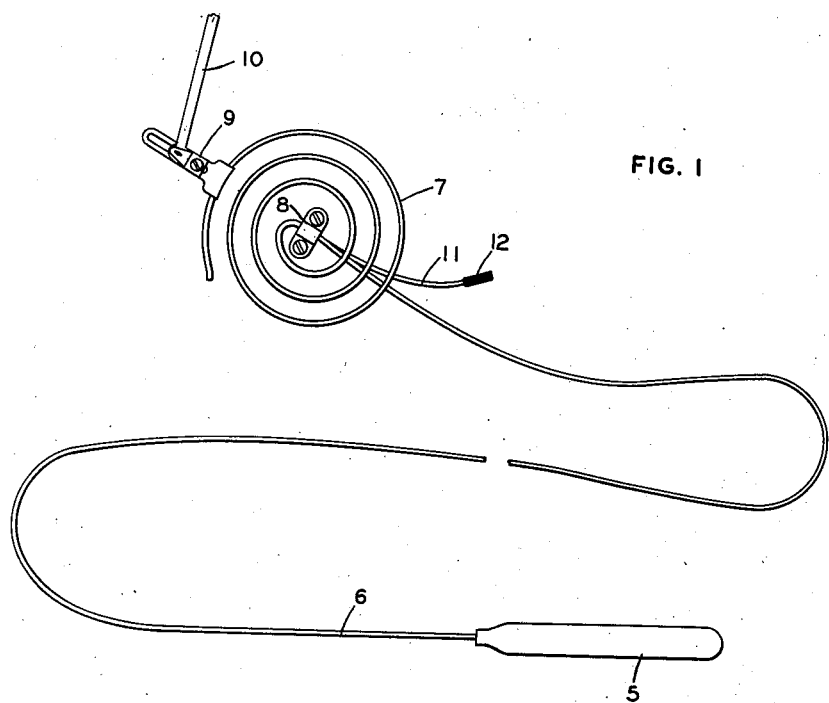
FIG. 1
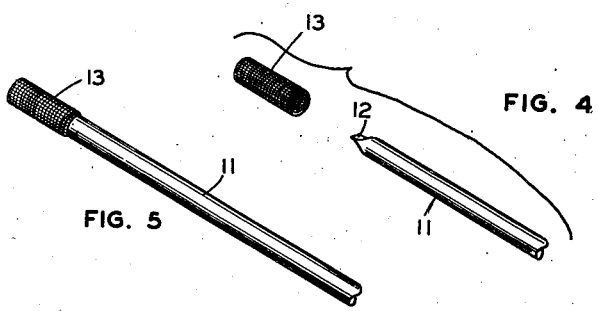
FIG. 4
FIG. 5
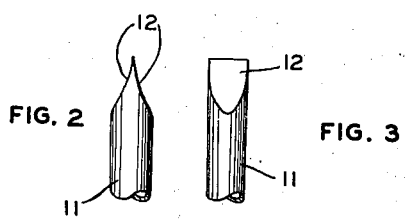
FIG. 2
FIG. 3
*INVENTOR.*
WILLIAM C. WEIS
BY D. Clyde Jones
ATTORNEY Patented June 28, 1949

2,474,503

UNITED STATES PATENT OFFICE 2,474,503

SEAL FOR FILLER TUBES

William C. Weis, Rochester, N. Y., assignor to Taylor Instrument Companies, Rochester, N. Y., a corporation of New York Application April 25, 1947, Serial No. 743,771

2 Claims. (Cl. 220—67)

1

This invention relates to fluid-proof seals and to methods of making the same.

In many arts such as evacuated chambers and in fluid-filled tube systems such as are utilized in measuring instruments and the like, it is essential to provide a secure seal therefor.

This invention has for its purpose a novel seal and a novel method of making said seal.

The various features and advantages of the invention will appear from the detailed description and claims when taken with the drawings in which Fig. 1 is a fragmentary view of a tube system having the seal of the present invention therein; Figs. 2 and 3 are two views of a cold welded seal at the end of the filler tube; Fig. 4 is an exploded perspective view of the welded end of the filler tube and the sleeve to be mounted thereon; and Fig. 5 is an enlarged perspective view of the finished seal comprising the cold welded end of the filler tube protected by the sleeve which is filled, along with its interstices, with solder.

In the drawing the invention is shown applied to a fluid-filled tube system of the type frequently used in indicating, recording and/or controlling instruments. This tube system comprises a metal bulb 5, which communicates through a metal capillary tube 6 with the interior of a Bourdon spring 7 at the inner end thereof, the outer end of this spring being sealed. This inner end of the Bourdon spring is secured to a bracket 8 by which the spring can be mounted in an instrument case (not shown). The sealed outer end portion of the Bourdon spring has a takeoff arm 9 secured thereto. A link 10 has one of its ends pivotally connected to an arm 9 and has its other end connected to a pivotally mounted pen arm or index (not shown) which may be similar to that disclosed in the patent to Tate et al. No. 2,361,885, granted October 31, 1944.

The tube system is filled with an actuating fluid (not shown). This fluid is introduced into the system during manufacturing by means of a filler tube 11 of ductile metal, such as copper, which communicates with the tube system through the mounting bracket 8, the free end of the filler tube being open during the filling operation. After the system has been filled with the actuating fluid, the filler tube is sealed by a round-nosed pair of pliers (not shown), which pinches and simultaneously draws out the crystals of the ductile metal of the filler tube, as indicated at 12 (Figs. 2, 4 and 5), to effect a cold weld.

In order to protect this seal, the end 12 is inserted into a sleeve 13. This sleeve is preferably open at each end and is preferably made of foraminous metal to which molten solder will cling. With the welded end of the filler tube inserted in the sleeve, both of these parts are inserted in molten solder until the sleeve and its interstices are filled with solder. Then these parts are removed from the molten solder and the adhering solder is permitted to cool. The cooled solder still fills the sleeve and the interstices thereof, to provide a further seal and protector for the free end portion of the filler tube.

What I claim is:

1. A seal for the end of a ductile metal tube or like comprising, a cold weld sealing an end of said tube, a porous metal sleeve enclosing said weld, and solder or the like adhering to the entire sealed end of said tube as well as to the entire surface of said sleeve substantially filling the same.

2. A seal for the end of a ductile metal tube or like comprising a cold weld sealing an end of said tube, an open-ended ductile sleeve of foraminous material enclosing said weld, and a mass of solder or the like adhering to the entire sealed end of said tube as well as substantially filling said sleeve and the interstices therein.

WILLIAM C. WEIS.

REFERENCES CITED

The following references are of record in the file of this patent:

UNITED STATES PATENTS

| Number | Name | Date |
|---|---|---|
| 123,269 | Lesson | Jan. 30, 1872 |
| 1,783,642 | Ferguson et al. | Dec. 2, 1930 |
| 1,803,211 | Schlaich | Apr. 28, 1931 |
| 1,916,474 | French et al. | July 4, 1933 |
| 2,094,877 | Dieckmann et al. | Oct. 5, 1937 |
| 2,373,038 | Lindsay | Apr. 3, 1945 |
| 2,413,370 | Palmer | Dec. 31, 1946 |
| 2,427,597 | Garner et al. | Sept. 16, 1947 |
| 2,429,438 | Wappler | Oct. 21, 1947 |

FOREIGN PATENTS

| Number | Country | Date |
|---|---|---|
| 492,687 | France | Mar. 29, 1919 |
| 648,031 | France | Aug. 7, 1928 |